United States Patent
Akita (10) Patent No.: US 11,040,697 B2
(45) Date of Patent: Jun. 22, 2021

(54) APPARATUS FOR CONTROLLING VEHICLE

(71) Applicant: SUZUKI MOTOR CORPORATION, Shizuoka (JP)

(72) Inventor: Akira Akita, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 0 days.

(21) Appl. No.: 16/746,429

(22) Filed: Jan. 17, 2020

(65) Prior Publication Data

US 2020/0231117 A1 Jul. 23, 2020

(30) Foreign Application Priority Data

Jan. 21, 2019 (JP) .............................. JP2019-007824

(51) Int. Cl.
*B60R 22/48* (2006.01)

(52) U.S. Cl.
CPC ...... *B60R 22/48* (2013.01); *B60R 2022/4866* (2013.01)

(58) Field of Classification Search
CPC ..................................................... B60R 22/48
USPC ..................................................... 340/457.1
See application file for complete search history.

(56) References Cited

U.S. PATENT DOCUMENTS

| | | | | |
|---|---|---|---|---|
| 2008/0068220 A1* | 3/2008 | Giesa | ................ | B60R 21/01516 340/945 |
| 2009/0132128 A1* | 5/2009 | Marriott | .................. | B60R 22/48 701/45 |
| 2014/0188347 A1* | 7/2014 | Tabe | .................... | B60R 21/0152 701/45 |
| 2014/0327752 A1* | 11/2014 | Tsuda | ................. | G06K 9/00838 348/77 |
| 2017/0364080 A1* | 12/2017 | Chintakindi | ......... | G05D 1/0088 |

FOREIGN PATENT DOCUMENTS

JP 2016-199207 A 12/2016

* cited by examiner

*Primary Examiner* — Kerri L McNally
(74) *Attorney, Agent, or Firm* — Rothwell, Figg, Ernst & Manbeck, P.C.

(57) ABSTRACT

In an apparatus for controlling a vehicle that includes seats each having a seat belt, a seat-belt detector configured to detect a wearing state of each of the seat belts, and a notifying unit that notifies various items of information, a controller determines whether to notify prompt information that prompts wearing of at least one of the seat belts in accordance with a wearing-obligatory number representing the number of one or more occupants who ride on the vehicle and have an obligation to wear the corresponding one or more seat belts and a seat-belt fastened seat number representing the number of one or more seats whose seat belts are fastened.

6 Claims, 4 Drawing Sheets

APPARATUS FOR CONTROLLING VEHICLE

CROSS REFERENCE TO RELATED APPLICATION

This application claims the benefit of Japanese Application Number 2019-007824, filed Jan. 21, 2019, the disclosures of which are incorporated herein in their entirety by reference.

TECHNICAL FIELD

The present invention relates to apparatuses for controlling a vehicle.

BACKGROUND ART

A known conventional technology determines whether the seat belt of each of one or more occupants is fastened, and urges at least one occupant to fasten the occupant's seat belt upon determining that the seat belt of the at least one occupant is not fastened.

Japanese Patent application publication No. 2016-199207 discloses, as an example of such a technology, an apparatus. The disclosed apparatus issues, to one or more occupants, a warning of non-wearing of at least one seat belt of a running vehicle upon the at least one seat belt being fastened while seating of at least one occupant on at least one seat corresponding to the at least one seat belt is detected by a seat sensor.

The disclosed apparatus cancels the issuance of the warning in response to an occupant's touching of a cancel button provided to the vehicle.

SUMMARY

Technical Problem

The above apparatus however issues, each time the vehicle starts to travel, a warning of non-wearing of at least one occupant, who has difficulty wearing a corresponding seat belt, such as a pregnant female or a sick person due to a specific injury or a specific disease, upon detection of seating of the at least one occupant on a corresponding at least one seat. This may cause a need to cancel the issuance of the warning each time the vehicle starts to travel, resulting in one or more occupants in the vehicle having uncomfortable feeling. In particular, this problem may occur prominently in cases where the above apparatus is applied to vehicles, such as taxies or buses, on which unspecified number of occupants can be taken.

From this viewpoint, the present invention aims to provide apparatuses for controlling a vehicle, each of which is capable of determining whether a seat belt of an occupant, who is able to fasten or wear a corresponding seat belt, is fastened although one or more other occupants, who have difficulty wearing corresponding seat belts, can ride on the vehicle.

The present invention is an apparatus for controlling a vehicle that includes a plurality of seats each having a seat belt, a seat-belt detector configured to detect a wearing state of each of the seat belt, and a notifying unit that notifies various items of information.

The apparatus includes a controller configured to determine whether to notify prompt information that prompts wearing of at least one of the seat belts in accordance with 1. A wearing-obligatory number representing the number of one or more occupants who ride on the vehicle and have an obligation to wear the corresponding one or more seat belts
2. A seat-belt fastened seat number representing the number of one or more seats whose seat belts are fastened

Advantageous Effects of Invention

The present invention makes it possible to determine whether at least one occupant, who has the obligation to wear the corresponding at least one seat belt, is wearing the corresponding at least one seat belt even if at least one occupant in the one or more occupants is exempted from the obligation to wear a corresponding at least one seat belt.

DESCRIPTION OF EMBODIMENTS

An exemplary aspect of the present invention is an apparatus for controlling a vehicle that includes a plurality of seats each having a seat belt, a seat-belt detector configured to detect a wearing state of each of the seat belt, and a notifying unit that notifies various items of information.

The apparatus includes a controller configured to determine whether to notify prompt information that prompts wearing of at least one of the seat belts in accordance with 1. A wearing-obligatory number representing the number of one or more occupants who ride on the vehicle and have an obligation to wear the corresponding one or more seat belts
2. A seat-belt fastened seat number representing the number of one or more seats whose seat belts are fastened This makes it possible to determine whether at least one occupant, who has the obligation to wear the corresponding at least one seat belt, is wearing the corresponding at least one seat belt even if at least one occupant in the one or more occupants is exempted from the obligation to wear a corresponding at least one seat belt.

EMBODIMENTS

The following describes in detail a driverless operation system according to each embodiment of the present invention.

First Embodiment

Figure 1:
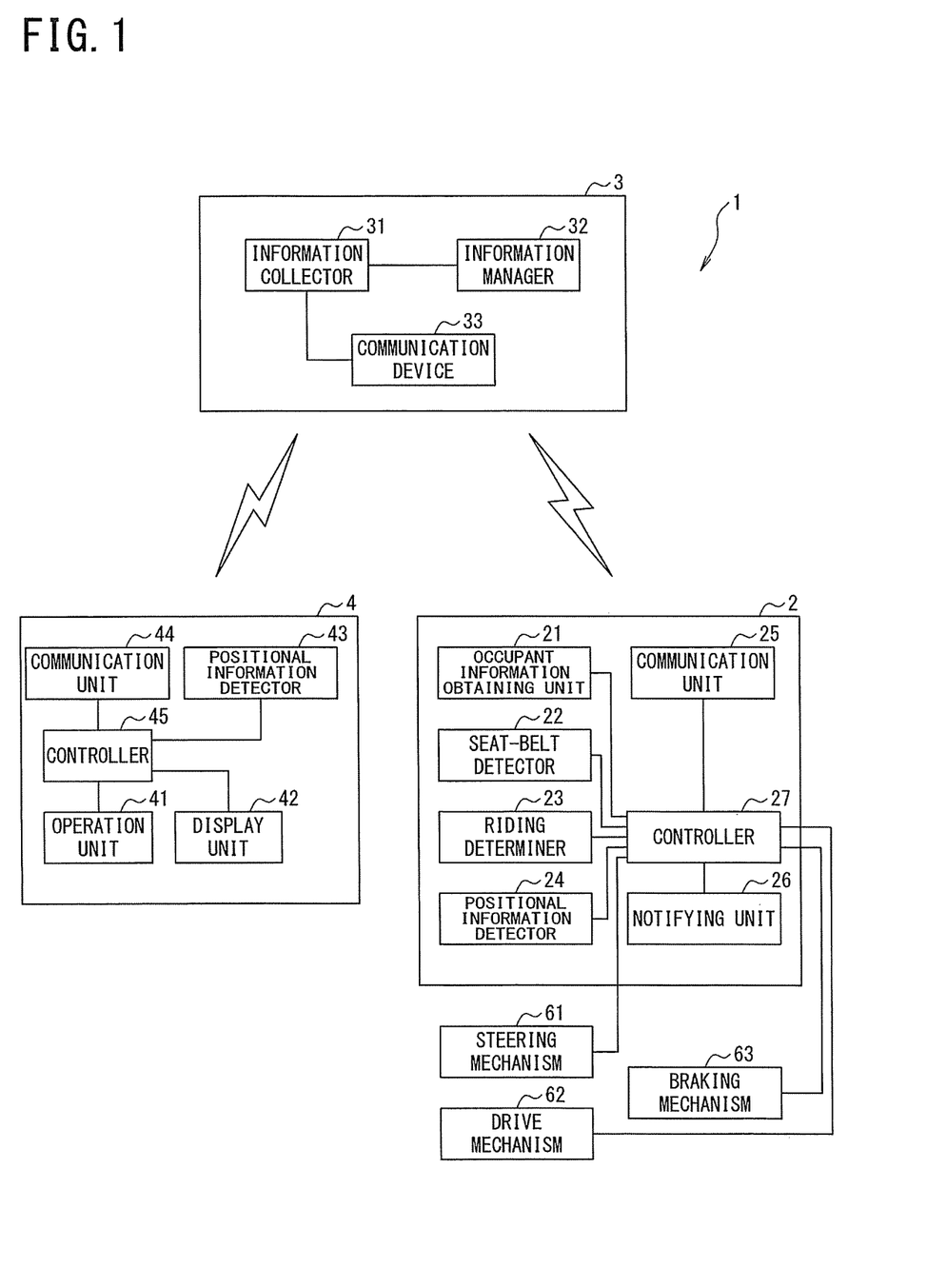
FIG. 1 is an overall structural block diagram schematically illustrating a driverless operation system according to a first embodiment of the present invention.

Referring to FIG. 1, a driverless operation system 1 according to the first embodiment of the present invention includes vehicular control apparatuses 2, a server 3, and information terminals 4. The driverless operation system 1 is configured such that each of a plurality of driverless autonomous vehicles, i.e. each of a plurality of autonomous buses, which incorporates therein a corresponding one of the vehicular control apparatuses 2, is controlled to travel through a predetermined route on which plural stations are provided. That is, the service route includes the stations, and a plurality of travelling sections, each of which is located between a corresponding adjacent pair of the stations. Each of the autonomous vehicles is scheduled to arrive at each station at a scheduled arrival time, and to depart from each station at a scheduled departure time.

In particular, the driverless operation system 1 according to the first embodiment is configured as a complete reservation bus operation system that enables only users with reservation through, for example, the information terminals 4 to take a selected autonomous vehicle as reservation occupants or occupants.

Description of Vehicular Control Apparatus 2

The vehicular control apparatus 2 is installed in each autonomous vehicle, and is configured to control how to report one or more seat belts being unfastened.

Specifically, the vehicular control apparatus 2 includes an occupant information obtaining unit 21, a seat belt detector 22, a riding determiner 23, a positional information detector 24, a communication unit 25, a notifying unit 26, and a controller 27.

The occupant information obtaining unit 21 is comprised of, for example, a receiver, an input device, and/or a camera, and is configured to obtain riding occupant information associated with each occupant who is scheduled to ride on the corresponding autonomous vehicle. The receiver receives, as the riding occupant information, information about each occupant sent from a selected information terminal 4 and/or an integrated circuit (IC) card used for the corresponding occupant. The input device enables each occupant to operate the input device to thereby input, as the riding occupant information, information about the corresponding occupant, so that the riding occupant information about each occupant is obtained by the occupant information obtaining unit 21.

The riding occupant information about each occupant can include reservation-occupant identification information indicative of whether the corresponding occupant is a reservation occupant who has made a reservation for the corresponding autonomous vehicle described later. The riding occupant information about each occupant also can include seat-belt obligatory/nonobligatory information indicative of whether the corresponding occupant has the obligation to wear, i.e. fasten, the corresponding seat belt.

Note that each of the information terminals 4 and IC cards used by a corresponding occupant has stored information required for taking each of the autonomous vehicles.

The occupant information obtaining unit 21 is for example configured to obtain an image of each occupant captured by the camera as the riding occupant information about the corresponding occupant.

The controller 27 can be configured to store image data of each reservation occupant that has been registered in the controller 27.

The controller 27 of the vehicular control apparatus 2 installed in each autonomous vehicle can be configured to analyze the obtained image of each occupant, and perform, based on the analyzed image of each occupant and the stored image data of each reservation occupant, a face recognition task to thereby determine whether each occupant who in in the corresponding autonomous vehicle is a corresponding one of the reservation occupants.

The controller 27 can also be configured to analyze the obtained image of each occupant, and determine, based on the analyzed image of each occupant, whether the corresponding occupant is capable of wearing, i.e. fastening, the corresponding seat belt. The controller 27 can be configured to 1. Generate the seat-belt obligatory/nonobligatory information for each occupant indicative of whether the corresponding occupant has the obligation to wear, i.e. fasten, the corresponding seat belt.

2. Store the seat-belt obligatory/nonobligatory information for each occupant such that the seat-belt obligatory/nonobligatory information for each occupant correlates with the riding occupant information about the corresponding occupant In particular, the controller 27 can be preferably configured to perform determination of whether each occupant is capable of wearing the corresponding seat belt only when no seat-belt obligatory/nonobligatory information is included in the riding occupant information obtained by the receiver or input device, or included in reservation information described later.

The controller 27 is capable of sending, to the server 3, the riding occupant information about each occupant obtained by the occupant information obtaining unit 21 via the communication unit 25.

For example, the occupant information obtaining unit 21 obtains, from a selected information terminal 4 or an IC card used by each occupant, the riding occupant information about the corresponding occupant. The occupant information obtaining unit 21 can obtain, from a selected information terminal 4 or an IC card used by each occupant, respective information items about 1. The date of birth of the corresponding occupant
2. Whether the corresponding occupant is pregnant
3. Whether the corresponding occupant is injured Then, the controller 27 can be configured to determine, based on the information items about each occupant, whether the corresponding occupant has the obligation to wear the corresponding seat belt. The controller 27 can be configured not to perform the determination for each occupant upon the seat-belt obligatory/nonobligatory information about the corresponding occupant is included in the riding occupant information about the corresponding occupant obtained by the receiver or input device, or included in the reservation information described later.

As another example, the occupant information obtaining unit 21 of the vehicular control apparatus 2 installed in each autonomous vehicle obtains, as the riding occupant information about each occupant, information inputted by the corresponding occupant being in the corresponding autonomous vehicle through the input device. The occupant information obtaining unit 21 can prompt, through the input device, each occupant to input information indicative of whether the corresponding occupant is capable of wearing a seat belt using the input device upon there being no seat-belt obligatory/nonobligatory information about the corresponding occupant in the riding occupant information about the corresponding occupant or in the reservation information described later.

The seat belt detector 22 of the vehicular control apparatus 2 installed in each autonomous vehicle is for example comprised of seat-belt sensors provided for the respective seats of the corresponding autonomous vehicle, and is configured to detect a wearing state of each seat belt using the corresponding one of the seat-belt sensors.

The riding determiner 23 of the vehicular control apparatus 2 installed in each autonomous vehicle is comprised of, for example, a receiver and/or an input device, and is configured to determine whether each user rides on the corresponding autonomous vehicle as an occupant based on information received by the receiver sent from a selected information terminal 4 or information inputted by the corresponding user, i.e. the corresponding occupant, through the input device.

The riding determiner 23 of the vehicular control apparatus 2 installed in each autonomous vehicle can be configured to determine whether each user (each occupant) rides on the corresponding autonomous vehicle based on the riding occupant information about the corresponding occupant obtained by the occupant information obtaining unit 21; this configuration eliminates the need for the receiver and the input device. The occupant information obtaining unit 21 can also serve as the riding determiner 23.

The riding determiner 23 is configured to identify that each occupant is a corresponding one of the reservation occupants in accordance with the information about the corresponding occupant received by the receiver or inputted by the input device, or the riding occupant information about the corresponding occupant. The riding determiner 23 can be configured to perform, based on the image of each occupant obtained from the camera and the stored image data of each reservation occupant, a face recognition task to thereby determine whether the corresponding occupant is a corresponding one of the reservation occupants.

The riding determiner 23 obtains information inputted by each occupant through the corresponding input device. The riding determiner 23 can prompt each occupant to input identification information about the corresponding occupant through the corresponding input device, such as the name of the corresponding occupant, if the corresponding occupant does not carry any information terminal 4 and IC card.

The positional information detector 24 of the vehicular control apparatus 2 installed in each autonomous vehicle includes an unillustrated global navigation satellite system (GNSS) antenna, and receives, via the GNSS antenna, radio signals, which are sent from GNSS satellites, to thereby obtain information about, for example, the latitude and longitude of the current position of the GNSS antenna of the corresponding autonomous vehicle based on the received radio signals.

The communication unit 25 communicates with the server 3 and information terminals 4 via communication media including radio communication networks to thereby transmit information to the server 3 and information terminals 4, and receive information transmitted from the server 3 and information terminals 4.

The notifying unit 26 of the vehicular control apparatus 2 installed in each autonomous vehicle is comprised of one or more output devices including, for example, a monitor, a speaker, lamps, meters, beepers, and a liquid crystal display device located outside the body of the corresponding autonomous vehicle, and is configured to output various items of information through at least one of the five physical senses using the one or more output devices.

The controller 27 is configured as a computer unit comprised of a central processing unit (CPU), a random access memory (RAM), a read only memory (ROM), a flash memory for storing backup data, one or more input ports, and one or more output ports.

Various constant values, various maps, and one or more programs are stored in the ROM of the computer unit; the one or more programs cause the computer unit to serve as the controller 27.

Specifically, the CPU executes, in a workspace in the RAM, the one or more programs stored in the ROM to thereby serve as the controller 27 of the first embodiment.

The occupant information obtaining unit 21, seat-belt detector 22, riding determiner 23, positional information detector 24, and various sensors are communicably connected to the controller 27 via the one or more input ports of the control unit.

In the vehicular control apparatus 2 installed in each autonomous vehicle, the communication unit 25, notifying unit 26, and various control targets including unillustrated doors of the corresponding autonomous vehicle are communicably connected to the controller 27 via the one or more output ports of the control unit.

Each of the autonomous vehicles includes driving wheels, a steering mechanism 61 for steering the driving wheels, a drive source, and a drive mechanism 62 for driving the drive source so that the drive source outputs drive power to the driving wheels. Each of the autonomous vehicles also includes a braking mechanism 63 for applying braking force to the driving wheels. These mechanisms 61 to 63 are communicably connected to the controller 27 via the one or more output ports of the control unit.

The controller 27 is configured to detect the wearing state of at least one occupant in accordance with, for example, information detected by the components 21 to 24, and to cause the notifying unit 26 to output information that prompts at least one occupant to fasten the corresponding seat belt upon determination that the at least one occupant is not fastening the corresponding seat belt in accordance with the wearing state of the at least one occupant.

Description of Server 3

The server 3 is configured as a computer unit comprised of an unillustrated central processing unit (CPU), a random access memory (RAM), a read only memory (ROM), a storage device, such as a hard-disk drive, one or more input ports, and one or more output ports.

One or more programs are stored in the hard-disk drive; the one or more programs cause the CPU to serve as an information collector 31 and an information manager 32. Specifically, the CPU executes the one or more programs stored in the hard-disk drive to thereby cause the server 3 to function as the information collector 31 and information manager 32.

The server 3 includes a communication device 33 that communicates with the vehicular control apparatus 2 installed in each autonomous vehicle and information terminals 4 via communication media including radio communication networks to thereby transmit information to the vehicular control apparatus 2 installed in each autonomous vehicle and information terminals 4, and receive information transmitted from the vehicular control apparatus 2 installed in each autonomous vehicle and information terminals 4.

The information collector 31 receives occupant information and reservation request information sent from at least one information terminal 4, and stores the occupant information and reservation request information in the hard-disk drive of the server 3. The meaning of each of the occupant information and reservation request information will be described later.

The information manager 32 is configured to generate, based on the occupant information and reservation request information stored in the hard-disk drive, (1) First information about a reservation status of each travelling section of the service route, in other words, the first information about a reservation status of each station where the one or more reservation occupants, who has sent the reservation request information to the server 3, get on/off (2) Second information about the one or more reservation occupants who get on/off each station For example, each travelling section of the service route is defined from a corresponding start station in the stations inclusive to an adjacent station in the stations inclusive. That is, a station located between a first section and an adjacent second section in the travelling direction of the corresponding autonomous vehicle serves as both an end station of the first section and a start station of the second section.

The information manager 32 is configured to manage the first information and the second information as the reservation information.

The information manager 32 can be configured to obtain the seat-belt obligatory/nonobligatory information for each reservation occupant in each autonomous vehicle from the occupant information and reservation request information for the corresponding autonomous vehicle.

The information manager 32 can also be configured to calculate, in accordance with the occupant information, reservation request information, and seat-belt obligatory/nonobligatory information, both (1) The wearing-obligatory number of one or more occupants who have the obligation to wear or fasten their seat belts (2) The wearing-nonobligatory number of one or more occupants who are exempted from the obligation to wear or fasten their seat belts.

Then, the information manager 32 can be configured to manage, as a part of the reservation information, the wearing-obligatory number and the wearing-nonobligatory number such that the wearing-obligatory number and the wearing-nonobligatory number correlate with the seat-belt obligatory/non-obligatory information for each reservation occupant.

The information manager 32 obtains the riding occupant information for each occupant obtained by the occupant information obtaining unit 21, and perform a management of the reservation information in accordance with the riding occupant information for each occupant. For example, the information manager 32 can update at least one of various pieces of information, which includes the seat-belt obligatory/nonobligatory information, managed thereby as an example of the management.

Note that either the controller 27 of the vehicular control apparatus 2 installed in each autonomous vehicle or the occupant information obtaining unit 21 can be configured to calculate the wearing-obligatory number and the wearing-nonobligatory number in accordance with the reservation information obtained from the server 3 and the riding occupant information obtained from the occupant information obtaining unit 21.

The information manager 32 also sends, to the vehicular control apparatus 2 installed in each autonomous vehicle, at least one of the various pieces of information managed thereby in response to a sending request for the at least one of the various pieces of the information.

Description of Information Terminal 4

Each information terminal 4 is configured as a computer unit comprised of a CPU, a RAM, a ROM, a flash memory, one or more input ports, and one or more output ports.

An operating system (OS) is stored in the ROM of the computer unit; the OS causes the computer unit to serve as the information terminal 4.

Specifically, the CPU executes the OS stored in the ROM to thereby serve as the information terminal 4.

Each information terminal 4 is comprised of, for example, a smartphone or a personal computer.

Each information terminal 4 includes an operation unit 41, a display unit 42, a positional information detector 43, a communication unit 44, and a controller 45.

The operation unit 41 is comprised of, for example, an input device, such as a touch sensor, switches, a keyboard, and a mouse, and is configured to receive input information inputted based on a user's operation of the input device.

The operation unit 41 can be comprised of a voice-input device, such as a microphone, and be configured to receive a voice signal generated from the voice-input device based on user's input voices through the voice-input device, and perform a voice recognition task based on the voice signal to thereby recognize voice information as input information to be inputted to the controller 45.

The display unit 42 is comprised of, for example, an image display, such as a liquid-crystal display, and is configured to display, for example, images generated by the controller 45.

The positional information detector 43 includes an unillustrated GNSS antenna, and receives, via the GNSS antenna, radio signals, which are sent from GNSS satellites, to thereby obtain information about, for example, the latitude and longitude of the current position of the GNSS antenna of the corresponding information terminal 4 based on the received radio signals.

The communication unit 44 communicates with, for example, the server 3 or other devices via communication media including radio communication networks to thereby transmit information to the server 3 or the other devices, and receive information transmitted from the server 3 or the other devices.

The controller 45 is configured to execute one or more programs, which are stored in, for example, the ROM, on the OS. That is, the controller 45 performs, based on the one or more programs, control of the above operation unit 41, display unit 42, positional information detector 43, and communication unit 44 to thereby obtain information, display images on the display unit 42, and transmit information to other devices.

The controller 45 of each information terminal 4 prompts a corresponding user to input the occupant information and the reservation request information using the operation unit 41.

The occupant information about each user, i.e. each occupant, includes information about the corresponding user.

The reservation request information about each user, i.e. each occupant, includes information indicative of when the corresponding user is scheduled to ride on a selected autonomous vehicle in the plurality of autonomous vehicles at a selected station in the stations.

The reservation request information about each user, i.e. each occupant, includes information indicative of whether the corresponding user (occupant) is capable of wearing a seat belt. The reservation request information about each user, i.e. each occupant, can include information indicative of whether the corresponding user (occupant) is temporarily incapable of wearing a seat belt.

For example, the controller 45 causes the display unit 42 to display a personal information setting image that prompts a corresponding user to input, on the personal information setting image, items of the occupant information, which include the name, address, the gender, the date of birth, and individual special comments, of the corresponding user.

Note that the operation unit 41 can include a camera, and the controller 45 can control the camera to capture an image of a corresponding user, and obtain the captured image as a part of the occupant information about the corresponding user.

The personal information setting image is preferably configured such that a user to easily input data for each of the individual special comments that include the following questions (1) Do you have any injured portions?

(2) Where are the injured portions, which should be answered only if the question (1) is YES?

(3) Do you have weak legs?

(4) Do you use a stick?

(5) Do you have weak eyes?

(6) Do you have a weak grip?

(7) Do you have weak ears?

(8) Do you accompany babies and/or infants?

(9) Are you pregnant?

(10) Do you have a broken bone?

The controller 45 of each information terminal 4 recognizes the occupant information set by the corresponding user, i.e. the corresponding occupant, on the personal information setting image, and transmits, to the server 3, the occupant information set by the corresponding occupant such that the occupant information about the corresponding occupant correlates with corresponding identification (ID) information for the corresponding occupant, which uniquely identifies the corresponding occupant.

The information collector 31 of the server 3 receives the occupant information about each occupant from the corresponding information terminal 4, and stores the occupant information about each occupant in the hard-disk drive of the server 3 such that the occupant information about each occupant correlates with the corresponding ID information.

For example, the controller 45 causes the display unit 42 to display a reservation image that prompts a corresponding user to input, on the reservation image, items of the reservation request information, which include (1) Which of the stations the corresponding user is scheduled to ride on a corresponding selected autonomous vehicle (2) Which of the stations the corresponding user is scheduled to alight from (get off) the selected autonomous vehicle (3) The reservation date and time the corresponding user is scheduled to ride on the selected autonomous vehicle The controller 45 of each information terminal 4 recognizes the reservation request information inputted by the corresponding user, i.e. the corresponding occupant, on the reservation image, and transmits, to the server 3, the reservation request information inputted by the corresponding occupant such that the reservation request information about the corresponding occupant correlates with the corresponding ID information for the corresponding occupant.

The information collector 31 of the server 3 receives the reservation request information about each user from the corresponding information terminal 4, and stores the reservation request information about each user in the hard-disk drive of the server 3 such that the reservation request information about each user correlates with the corresponding ID information. Then, the information collector 31 of the server 3 transmits, to each information terminal 4 that has transmitted the reservation request information, a reservation completion report to the corresponding information terminal 4. This results in each user, who has sent to the reservation request information to the server 3, being registered as a reservation occupant.

When receiving the reservation completion report, the controller 45 of each information terminal 4 is configured to transmit, to the server 3, the current positional information about the corresponding user, i.e. corresponding reservation occupant, obtained by the positional information detector 43 together with the corresponding ID information every predetermined interval from a predetermined time before the reservation time.

Each time of receiving the current positional information sent from each information terminal 4, the information collector 31 of the server 3 transmits, to the vehicular control apparatus 2 of the selected autonomous vehicle on which the corresponding user (reservation occupant) is scheduled to ride, the received current positional information together with the corresponding ID information.

This enables the vehicular control apparatus 2 of the selected autonomous vehicle on which each user (reservation occupant) is scheduled to ride to recognize the current position of each user (reservation occupant) who is scheduled to ride on the selected autonomous vehicle.

The information manager 32 of the server 3 is configured to generate, based on the reservation request information about each user (reservation occupant), the reservation information including (1) The first information about the reservation status of each travelling section of the service route, each travelling section being defied from a corresponding start station in the stations inclusive to an adjacent station in the stations inclusive, in other words, the first information about the reservation status of each station where one or more occupants get on/off (2) The second information about one or more occupants who get on/off each station For example, the reservation information for each autonomous vehicle includes 1. The scheduled arrival time of the corresponding autonomous vehicle at each station 2. The number of one or more occupants riding on the corresponding autonomous vehicle when the corresponding autonomous vehicle arrives at each station 3. The number of one or more users, i.e. one or more reservation occupants, who are getting on the corresponding autonomous vehicle at each station 4. The number of one or more occupants who are getting off the corresponding autonomous vehicle at each station 5. The number of one or more occupants riding on the corresponding autonomous vehicle when the corresponding autonomous vehicle leaves from each station 6. The seat-belt obligatory/nonobligatory information and the image information about each of one or more occupants riding on the corresponding autonomous vehicle 7. The seat-belt obligatory/non-obligatory information and image information about each of one or more occupants waiting for the corresponding autonomous vehicle at each station For example, the seat-belt obligatory/non-obligatory information about each reservation occupant can be generated based on the corresponding occupant information set on the personal setting information image.

Vehicular Control Apparatus 2

The controller 27 of the vehicular control apparatus 2 installed in each autonomous vehicle is configured to (1) Obtain, from the server 3, the reservation information for the corresponding autonomous vehicle managed by the server 3

(2) Obtain, from the occupant information obtaining unit 21, the riding occupant information about each occupant if necessary arises (3) Calculate the number of one or more occupants, each of who has the obligation to wear the corresponding seat belt, in accordance with the reservation information about the one or more occupants or both the reservation information and the riding occupant information about the one or more occupants (4) Calculate the number of one or more seats whose seat belts are fastened in accordance with the wearing state of each seat belt detected by the corresponding seat-belt detector 22

Then, the controller 27 of the vehicular control apparatus 2 installed in each autonomous vehicle is configured to determine whether one or more occupants, each of who can wear the corresponding seat belt, are each wearing the corresponding seat belt in accordance with 1. The wearing-obligatory number of one or more occupants who have the obligation to wear or fasten their seat belts 2. The number of one or more seats, which will be referred to as a seat-belt fastened seat number, where the corresponding seat belts are fastened Upon determination that at least one occupant, who has the obligation to fasten the corresponding seat belt, is not fastening the corresponding seat belt based on a result of the determination, the controller 27 is configured to cause the notifying unit 26 to output a seat-belt wearing message that prompts the at least one occupant to fasten the corresponding seat belt.

Note that the wearing-obligatory number in each autonomous vehicle is calculated by the controller 27 of the corresponding vehicular control apparatus 2 as described above, but can be calculated by the information manager 32 of the server 3.

The controller 27 or the information manager 32 can be configured to calculate the wearing-nonobligatory number of one or more occupants, each of who is exempted from the obligation to wear the corresponding seat belt, in addition to the wearing-obligatory number.

Specifically, upon determination that the wearing-obligatory number is in agreement with the seat-belt fastened seat number, the controller 27 is configured to disable the notifying unit 26 from outputting such a seat-belt wearing message. Similarly, upon determination that the seat-belt fastened seat number is more than the wearing-obligatory number, the controller 27 is configured to determine that one or more occupants, who have the obligation to wear the corresponding seat belts, are wearing the corresponding seat belts, and disable the notifying unit 26 from outputting such a seat-belt wearing message.

Otherwise, upon determination that the seat-belt fastened seat number is less than the wearing-obligatory number, the controller 27 is configured to determine that at least one occupant, who has the obligation to wear the corresponding seat belt, is not wearing the corresponding seat belt, and cause the notifying unit 26 to output a seat-belt wearing message that prompts the at least one occupant to fasten the corresponding seat belt.

Figure 2:
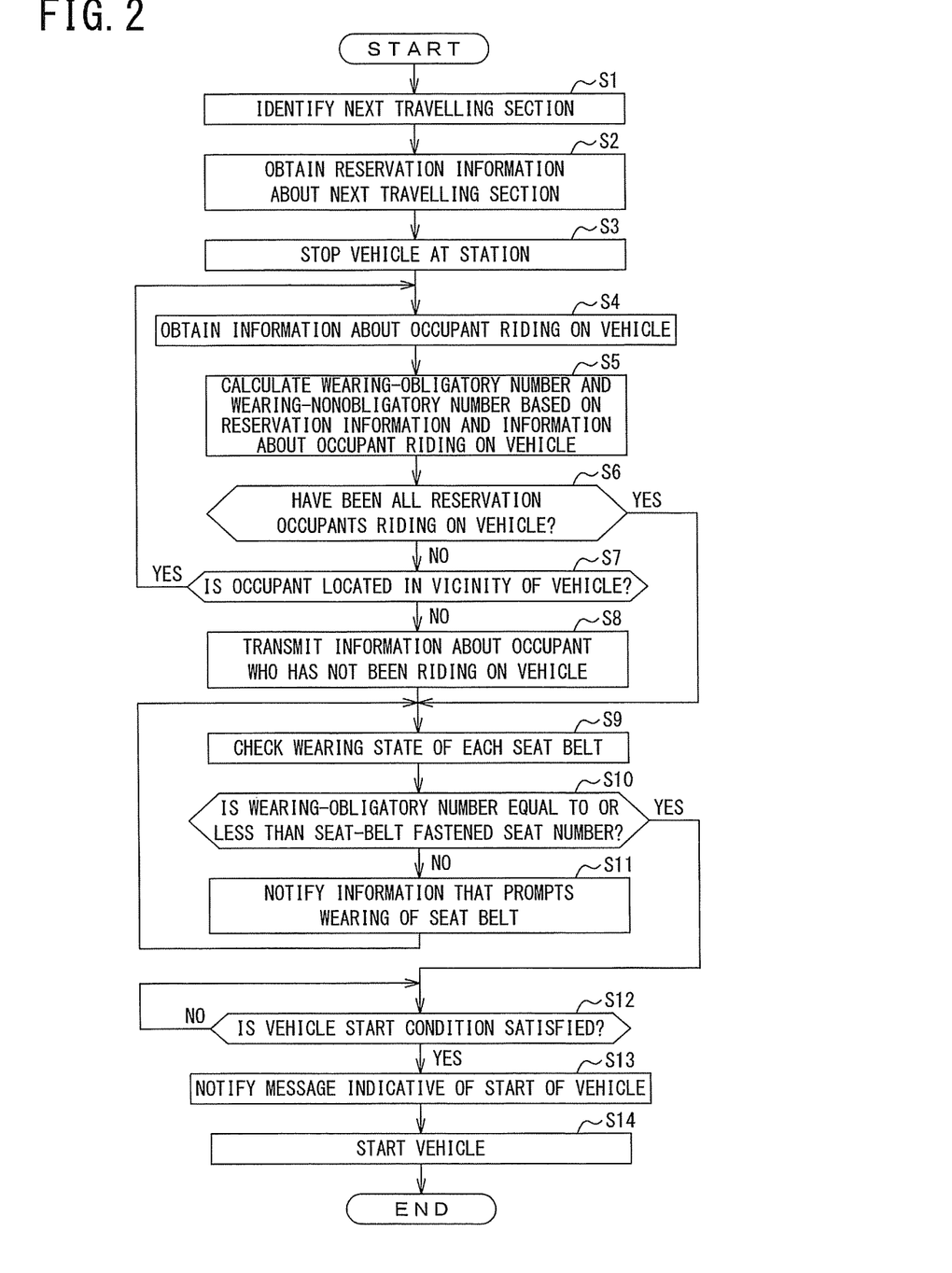
FIG. 2 is a flowchart schematically illustrating a seat-belt wearing determination routine carried out by a vehicular control apparatus according to the first embodiment of the present invention.

Next, the following describes a seat-belt wearing determination routine carried out by the vehicular control apparatus 2 installed in each autonomous vehicle with reference to FIG. 2. Note that the vehicular control apparatus 2 installed in each autonomous vehicle is configured to execute the seat-belt wearing determination routine a predetermined time before the corresponding autonomous vehicle, which is travelling on a current travelling section (N-th travelling section where N is a positive integer), arrives at a next (N+1)-th travelling section.

When starting the seat-belt wearing determination routine, the control unit 27 identifies, based on, for example, the information about the current position of the corresponding autonomous vehicle measured by the positional information detector 24, the next (N+1)-th travelling section located between a corresponding adjacent pair of the stations on which the corresponding autonomous vehicle is scheduled to travel in step S1.

Next, the controller 27 obtains, from the server 3, the reservation information about the (N+1)-th travelling section of the corresponding autonomous vehicle in step S2. Note that the controller 27 can identify, as the (N+1)-th travelling section on which the corresponding autonomous vehicle is scheduled to travel, an immediately adjacent travelling section relative to the current travelling section independently of whether the immediately adjacent travelling section has been reserved for travelling of the corresponding autonomous vehicle to travel, or the nearest travelling section that has been reserved for travelling of the corresponding autonomous vehicle.

Subsequently, the controller 27 controls, for example, the steering mechanism 61 and the braking mechanism 63 to thereby cause the corresponding autonomous vehicle to stop at the end station of the N-th travelling section, i.e. the start station of the (N+1)-th travelling section, upon determination, based on the reservation information, that at least one user, i.e. at least one reservation occupant, is scheduled to get on the corresponding autonomous vehicle at the start station of the (N+1)-th travelling section, and/or at least one riding occupant on the corresponding autonomous vehicle is scheduled to get off the corresponding autonomous vehicle at the start station of the (N+1)-th travelling section in step S3.

In step S4, the controller 27 instructs the occupant information obtaining unit 21 and/or the riding determiner 23 to obtain the riding occupant information about at least one reservation occupant scheduled to travel on the corresponding autonomous vehicle at the start station of the (N+1)-th travelling section. Note that the controller 27 can obtain the riding occupant information about the at least one reservation occupant simultaneously with or before the stop of the corresponding autonomous vehicle at the start station.

In step S5, the controller 27 calculates, based on the reservation information and/or the riding occupant information about each occupant who is scheduled to ride on the corresponding autonomous vehicle, (1) The wearing-obligatory number of one or more occupants, who have reserved for the corresponding (N+1)-th travelling section and have the obligation to wear the corresponding seat belts (2) The wearable nonobligatory number of one or more occupants, who have reserved for the (N+1)-th travelling section and are exempted from the obligation to wear the corresponding seat belts Note that the operation in step S5 can be carried out again during steps S7 to S10 described later. This makes it possible to, even if one or more occupants in all the reservation occupants for the (N+1)-th travelling section do not ride on the corresponding autonomous vehicle at the (N+1)-th travelling section, determine whether one or more reservation occupants actually riding on the corresponding autonomous vehicle can wear the corresponding seat belts accurately, thus determining whether to output a seat-belt wearing message accurately.

The controller 27 can be configured not to carry out the operation in step S5 again, but to obtain, based on the reservation information about the (N+1)-th travelling section, (1) The non-riding wearing-obligatory number of one or more occupants, who have reserved for the corresponding (N+1)-th travelling section and have the obligation to wear the corresponding seat belts but do not ride on the corresponding autonomous vehicle (2) The non-riding wearing-nonobligatory number of one or more occupants, who have reserved for the (N+1)-th travelling section and are exempted from the obligation to wear the corresponding seat belts but do not ride on the corresponding autonomous vehicle Then, the controller 27 can be configured to subtract, from the wearing-obligatory number, the non-riding wearing-obligatory number to thereby calculate a corrected value of the wearing-obligatory number to be used in step S10. Additionally, the controller 27 can be configured to subtract, from the wearing-nonobligatory number, the non-riding wearing-nonobligatory number to thereby calculate a corrected value of the wearing-nonobligatory number.

The controller 27 can be configured to execute the operation in step S5 immediately before or after the operation in step S9 described later.

When executing the operation in step S5 immediately before or after the operation in step S9, the controller 27 can be configured to obtain, based on the reservation information about the (N+1)-th travelling section, (1) The non-riding wearing-obligatory number of one or more occupants, who have reserved for the corresponding (N+1)-th travelling section and have the obligation to wear the corresponding seat belts but do not ride on the corresponding autonomous vehicle (2) The non-riding wearing-nonobligatory number of one or more occupants, who have reserved for the (N+1)-th travelling section and are exempted from the obligation to wear the corresponding seat belts but do not ride on the corresponding autonomous vehicle (3) Subtract, from the wearing-obligatory number, the non-riding wearing-obligatory number to thereby calculate a corrected value of the wearing-obligatory number to be used in step S10

(4) Subtract, from the wearing-nonobligatory number, the non-riding wearing-nonobligatory number to thereby calculate a corrected value of the wearing-nonobligatory number Following the operation in step S5, the controller 27 determines, based on the reservation information about the (N+1)-th travelling section, whether all the reservation occupants for the (N+1)-th travelling section have been riding on the corresponding autonomous vehicle in step S6. Upon determination that at least one of all the reservation occupants for the (N+1)-th travelling section have not been riding on the corresponding autonomous vehicle (NO in step S6), the controller 27 determines whether there is at least one reservation occupant, which has not been riding on the corresponding autonomous vehicle, for the (N+1)-th travelling section in the vicinity of the start station of the (N+1)-th travelling section in accordance with, for example, the positional information of at least one information terminal 4 corresponding to the at least one reservation occupant in step S7.

Upon determination that there is at least one reservation occupant for the (N+1)-th travelling section in the vicinity of the start station of the (N+1)-th travelling section (YES in step S7), the controller 27 returns to step S4, and repeatedly executes the operations in steps S4 to S7 until the determination in step S6 is affirmative or the determination in step S7 is negative.

Otherwise, upon determination that there are no reservation occupants for the (N+1)-th travelling section in the vicinity of the start station of the (N+1)-th travelling section (NO in step S7), the controller 27 transmits, to the server 3, the occupant information about the at least one reservation occupant, who has not been riding on the corresponding autonomous vehicle in step S8. Thereafter, the controller 27 provides, to the at least one information terminal 4 corresponding to the at least one reservation occupant, information including the arrival of the corresponding autonomous vehicle at the start station of the (N+1)-th travelling section, and the scheduled departure time of the corresponding autonomous vehicle from the start station of the (N+1)-th travelling section in step S8.

Upon determination that all the reservation occupants for the (N+1)-th travelling section have been riding on the corresponding autonomous vehicle (YES in step S6), or upon completion of the operation in step S8, the controller 27 identifies whether each seat belt is worn, i.e. fastened, in accordance with the wearing state of the corresponding seat belt detected by the corresponding seat belt detector 22 in step S9. In particular, the controller 27 calculates the seat-belt fastened seat number representing the number of one or more seats whose seat belts are fastened in accordance with the wearing state of each seat belt detected by the corresponding seat-belt detector 22 in step S9.

In step S10, the controller 27 determines whether the value of the wearing-obligatory number calculated in step S5 is equal to or less than the seat-belt fastened seat number calculated in step S9.

Upon determination that the value of the wearing-obligatory number calculated in step S5 is more than the seat-belt fastened seat number calculated in step S9 (NO in step S10), the controller 27 determines that at least one riding occupant, who has the obligation to wear the corresponding seat belt, is not wearing the corresponding seat belt. Note that the determination in step S10 is carried out based on the premise that all the riding occupants are seating on the corresponding seats so that there are no standing occupants in the corresponding autonomous vehicle.

Then, the controller 27 causes the notifying unit 26 to output a seat-belt wearing message that prompts the at least one riding occupant to fasten the corresponding seat belt in step S11. Thereafter, the controller 27 returns to step S9, and repeatedly executes the operations in steps S9 to S11 until the determination in step S10 is affirmative.

Otherwise, upon determination that the value of the wearing-obligatory number calculated in step S5 is equal to or less than the seat-belt fastened seat number calculated in step S9 (YES in step S10), the controller 27 determines whether a predetermined vehicle start condition is satisfied in step S12. Upon determination that the predetermined vehicle start condition is not satisfied (NO in step S12), the controller 27 repeatedly executes the determination in step S12.

Otherwise, upon determination that the predetermined vehicle start condition is satisfied (YES in step S12), the controller 27 causes the notifying unit 26 to inform all the riding occupants of a message indicative of a start of the corresponding autonomous vehicle in step S13. Thereafter, the controller 27 controls, for example, the steering mechanism 61 and the drive mechanism 62 to thereby cause the corresponding autonomous vehicle to start from the start station of the (N+1)-th travelling section in step S14, and thereafter, the controller 27 terminates the seat-belt wearing determination routine.

As described above, the vehicular control apparatus 2 installed in each autonomous vehicle according to the first embodiment is configured to (1) Calculate, based on the reservation information for the corresponding autonomous vehicle, the wearing-obligatory number of one or more riding occupants, each of who has the obligation to wear the corresponding seat belt (2) Determine, based on the wearing-obligatory number and seat-belt fastened seat number indicative of the number of seat-belt fastened seats, whether each of the one or more riding occupants, who has the obligation to wear the corresponding seat belt, is wearing, i.e. fastening, the corresponding seat belt (3) Cause the notifying unit 26 to notify information that prompts at least one occupant to wear the corresponding seat belt upon determination that the at least one occupant is not wearing the corresponding seat belt If the one or more riding occupants, who have the obligation to wear the corresponding seat belts, are not wearing the corresponding seat belts, this configuration reliably outputs, to the one or more occupants, information that prompts the one or more occupants to wear the corresponding seat belts while preventing output of the notification to one or more other riding occupants who are exempted from the obligation to wear the corresponding seat belts even if the other riding occupants are not wearing the corresponding seat belts.

In particular, upon determination that the wearing-obligatory number is in agreement with the seat-belt fastened seat number, the vehicular control apparatus 2 disables the notifying unit 26 from outputting such a seat-belt wearing message. This configuration prevents the output of information that prompts at least one riding occupant to wear the corresponding seat belt if the at least one riding occupant, who has the obligation to wear their seat belts, are likely to wear their seat belts.

Otherwise, upon determination that the seat-belt fastened seat number is less than the wearing-obligatory number, the vehicular control apparatus 2 instructs the notifying unit 26 to output such a seat-belt wearing message. This configuration makes it possible to output information that prompts at least one riding occupant to wear the corresponding seat belt accurately if the at least one riding occupant, who has the obligation to wear the corresponding seat belt, is likely not to wear the corresponding seat belt.

Second Embodiment

Figure 3:
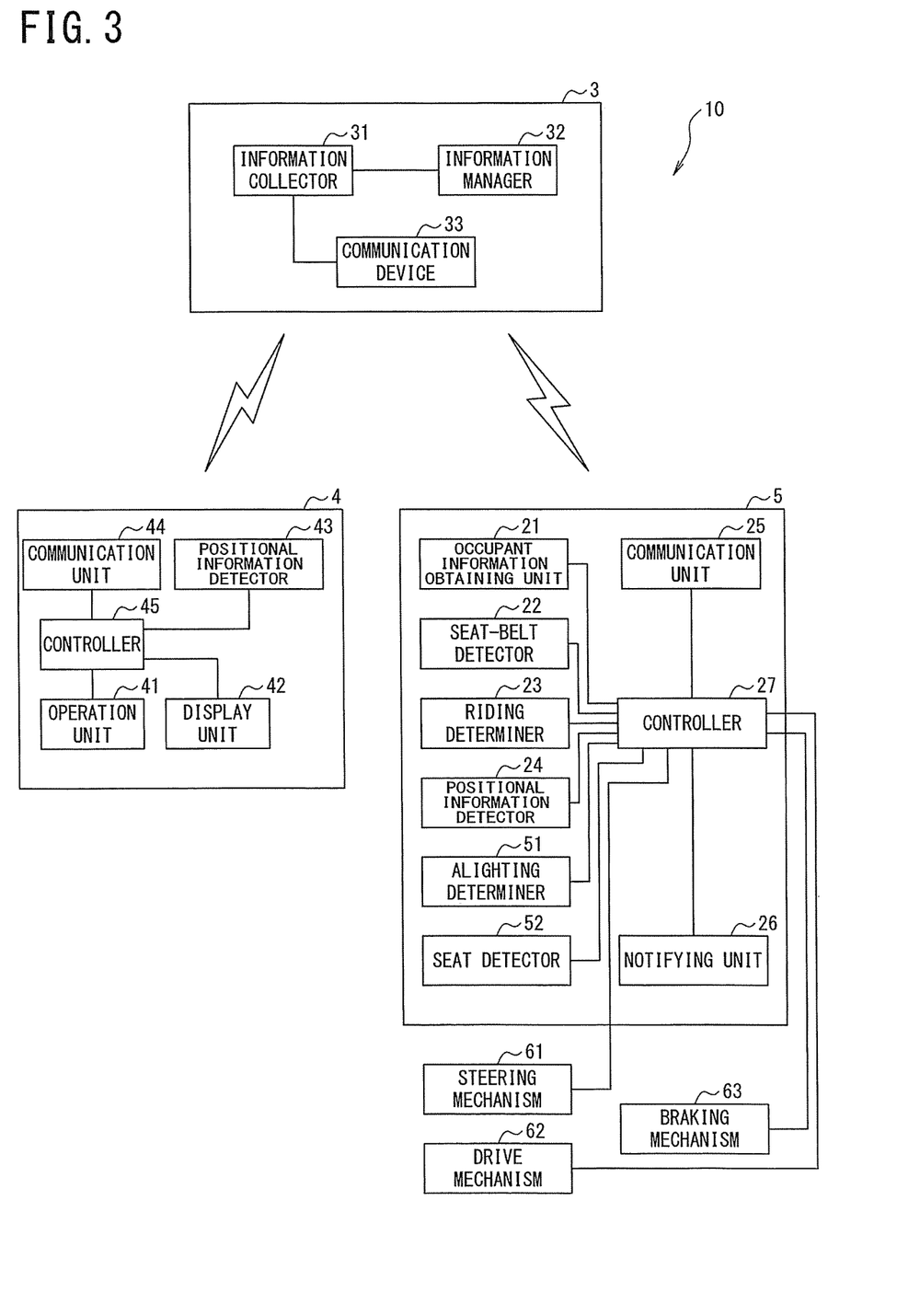
FIG. 3 is an overall structural block diagram schematically illustrating a driverless operation system according to a second embodiment of the present invention.

The following describes a driverless operation system 10 according to the second embodiment of the present invention. The structures and/or functions of the driverless operation system 10 according to the second embodiment are different from those of the driverless operation system 1 according to the first embodiment in the following points. The following therefore mainly describes the different points.

The driverless operation system 1 according to the first embodiment is configured as a complete reservation bus operation system that enables only users with reservation to take a selected autonomous vehicle as reservation occupants or occupants.

In contrast, the driverless operation system 10 is configured as a reservation bus operation system that enables both users with reservation and users without reservation to take a selected autonomous vehicle as occupants.

The driverless operation system 10 includes a vehicular control apparatus 5 installed in each autonomous vehicle, and the vehicular control apparatus 5 additionally includes an alighting determiner 51 and a seat detector 52 in addition to the above components 21 to 27 set forth above.

The alighting determiner 51 is configured to determine whether each occupant has alighted from the corresponding autonomous vehicle, and the seat detector 52 is configured to determine whether an occupant is seated on each seat of the corresponding autonomous vehicle.

The occupant information obtaining unit 21 obtains, from a selected information terminal 4 or an IC card used by each occupant, the seat-belt obligatory/nonobligatory information using, for example, the receiver. The seat-belt obligatory/nonobligatory information represents whether each occupant has the obligation to wear, i.e. fasten, the corresponding seat belt.

In addition, the occupant information obtaining unit 21 obtains, from a selected information terminal 4 or an IC card used by each occupant, respective information items about 1. The date of birth of the corresponding occupant
2. Whether the corresponding occupant is pregnant
3. Whether the corresponding occupant is injured Then, the controller 27 is configured to determine, based on the information items about each occupant, whether the corresponding occupant has the obligation to wear the corresponding seat belt.

The occupant information obtaining unit 21 can be configured to calculate, based on the determination result and/or the seat-belt obligatory/nonobligatory information obtained from a selected information terminal 4, the IC card, or the server 3, both (1) The wearing-obligatory number of one or more occupants who have the obligation to wear or fasten their seat belts (2) The wearing-nonobligatory number of one or more occupants who are exempted from the obligation to wear or fasten their seat belts.

The alighting determiner 51 is comprised of a receiver for receiving information sent from each information terminal 4 and/or an input device that enables a user to operate the input device to thereby input information.

The alighting determiner 51 obtains, from a selected information terminal 4 or an IC card used by each occupant, alighting occupant information about an occupant each time the occupant alights from the corresponding autonomous vehicle using for example the receiver. Then, the alighting determiner 51 determines whether each occupant has alighted from the corresponding autonomous vehicle based on the alighting occupant information about the corresponding occupant.

Note that each of the information terminals 4 and IC cards used by a corresponding occupant has stored the seat-belt obligatory/nonobligatory information about the corresponding occupant, and information required for taking each of the autonomous vehicles.

The alighting determiner 51 receives information inputted by an occupant's operation of the input device when the occupant gets of the corresponding autonomous vehicle. The alighting determiner 51 can prompt each occupant to input identification information about the corresponding occupant through the corresponding input device, such as the name or the ID information about the corresponding occupant, The seat detector 52 of the vehicular control apparatus 5 installed in each autonomous vehicle is for example comprised of seat sensors provided for the respective seats of the corresponding autonomous vehicle, and is configured to determine whether an occupant is seated on each seat detected by the corresponding seat sensor.

The controller 27 of the vehicular control apparatus 5 installed in each autonomous vehicle is configured to identify at least one occupant who gets on and gets off the corresponding autonomous vehicle without reservation in accordance with the riding occupant information about the corresponding at least one occupant obtained by the occupant information obtaining unit 21, and the alighting occupant information about the corresponding at least one occupant obtained by the alighting determiner 51. This therefore enables the controller 27 to identify one or more occupants riding on the corresponding autonomous vehicle.

The controller 27 is configured to generate the seat-belt obligatory/nonobligatory information for each occupant indicative of whether the corresponding occupant has the obligation to wear, i.e. fasten, the corresponding seat belt in accordance with the riding occupant information about the corresponding at least one occupant obtained by the occupant information obtaining unit 21.

The controller 27 calculates, based on the reservation information used in the first embodiment and the seat-belt obligatory/nonobligatory information about each of the reservation occupants scheduled to ride on the corresponding autonomous vehicle, and non-reservation occupants without reservation, who are riding on the corresponding autonomous vehicle, (1) The wearing-obligatory number of one or more occupants, who have the obligation to wear the corresponding seat belts (2) The wearing-nonobligatory number of one or more occupants, who are exempted from the obligation to wear the corresponding seat belts The controller 27 controls the notifying unit 26 in accordance with the wearing-obligatory number and the seat-belt fastened seat number to thereby output information that prompts at least one occupant to fasten the corresponding seat belt, or disable output of such prompting information.

Specifically, upon determination that the wearing-obligatory number is in agreement with the seat-belt fastened seat number, the controller 27 is configured to disable the notifying unit 26 from outputting such prompting information.

Note that upon determination that the seat-belt fastened seat number is more than the wearing-obligatory number, the controller 27 can be configured to determine that one or more occupants, who have the obligation to wear the corresponding seat belts, are wearing the corresponding seat belts. At that time, the controller 27 can use the number of one or more seats on each of which an occupant is detected to be seated by the alighting determiner 51 as the seat-belt fastened seat number. This configuration prevents one or more seats, whose seat belts are fastened to, for example, hold baggage on the one or more seats without no occupants being seated thereon, from being counted as the seat-belt fastened seat number.

Otherwise, upon determination that the seat-belt fastened seat number is less than the wearing-obligatory number, the controller 27 is configured to determine that at least one occupant, who has the obligation to wear the corresponding seat belt, is not wearing the corresponding seat belt, and cause the notifying unit 26 to output a seat-belt wearing message that prompts the at least one occupant to fasten the corresponding seat belt.

Figure 4:
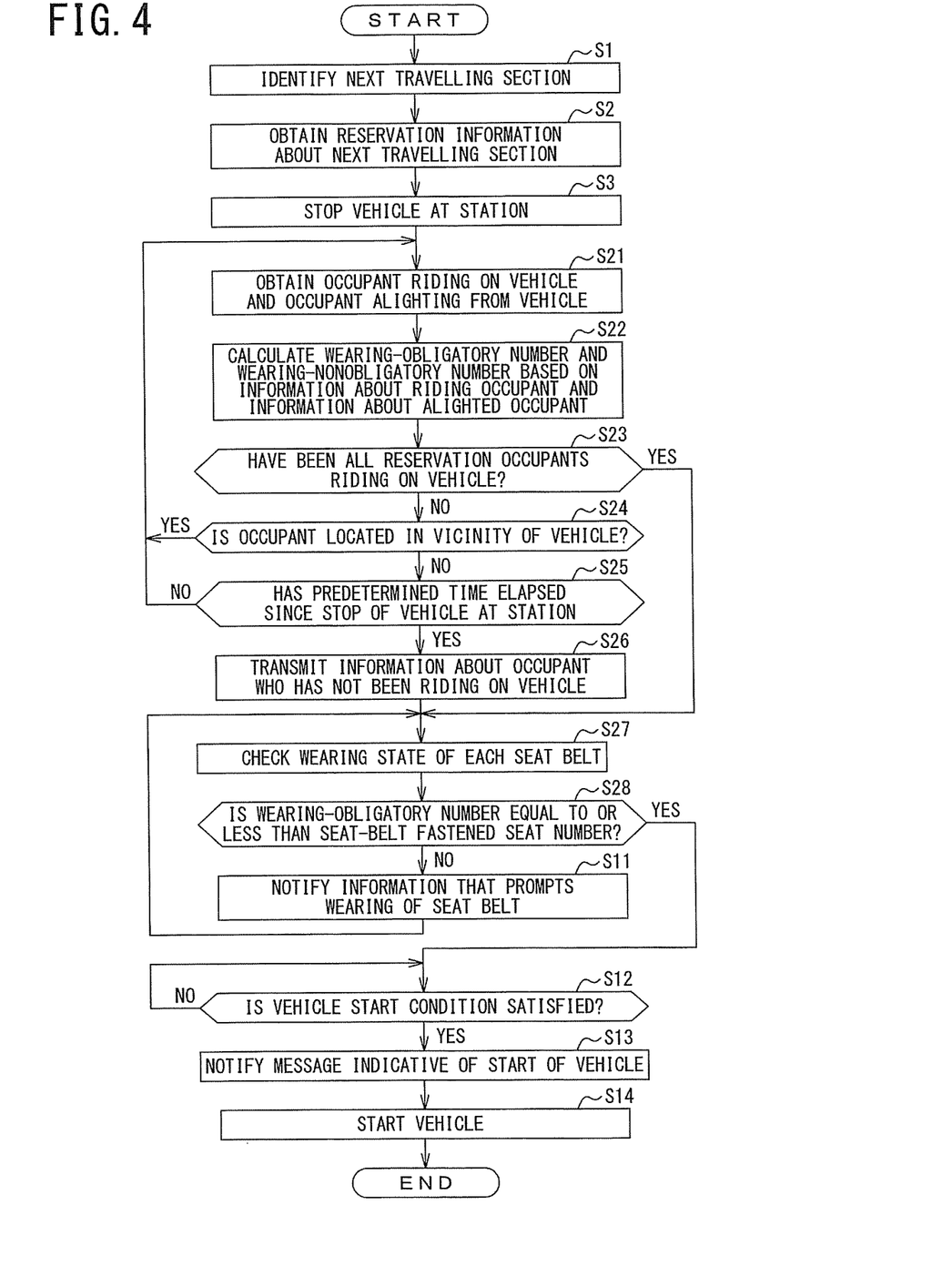
FIG. 4 is a flowchart schematically illustrating a seat-belt wearing determination routine carried out by a vehicular control apparatus according to the second embodiment of the present invention.

Next, the following describes a seat-belt wearing determination routine carried out by the vehicular control apparatus 5 installed in each autonomous vehicle with reference to FIG. 5. Note that the vehicular control apparatus 5 installed in each autonomous vehicle is configured to execute the seat-belt wearing determination routine a predetermined time before the corresponding autonomous vehicle, which is travelling on a current travelling section (N-th travelling section), arrives at a next (N+1)-th travelling section.

Like the first embodiment, the controller 27 identifies the next (N+1)-th travelling section, obtains, from the server 3, the reservation information about the (N+1)-th travelling section, and causes the corresponding autonomous vehicle to stop at the end station of the N-th travelling section, i.e. the start station of the (N+1)-th travelling section in steps S1 to S3.

In step S21, the controller 27 instructs the riding determiner 23 to

1. Obtain the riding occupant information about at least one occupant who rides on the corresponding autonomous vehicle at the start station of the (N+1)-th travelling section if there is at least one occupant riding on the corresponding autonomous vehicle at the start station of the (N+1)-th travelling section 2. Obtain the alighting occupant information about at least one occupant who alights from the corresponding autonomous vehicle at the start station of the (N+1)-th travelling section if there is at least one occupant alighting from the corresponding autonomous vehicle at the start station of the (N+1)-th travelling section In step S22, the controller 27 refers to (1) the reservation information about each occupant who is scheduled to ride on the corresponding autonomous vehicle, (2) the riding occupant information about at least one occupant, (3) the alighting occupant information about at least one occupant, and (4) the seat-belt obligatory/nonobligatory information to thereby calculate, based on the reference result, (1) The wearing-obligatory number of one or more occupants, who have the obligation to wear the corresponding seat belts (2) The wearing-nonobligatory number of one or more occupants, who are exempted from the obligation to wear the corresponding seat belts In particular, if one or more non-reservation occupants who have the obligation to wear the corresponding seat belts ride on the corresponding autonomous vehicle, the controller 27 adds the number of the one or more non-reservation occupants to the wearing-obligatory number of one or more reservation occupants obtained based on the reservation information to thereby calculate the wearing-obligatory number of one or more riding occupants, who have the obligation to wear the corresponding seat belts.

Otherwise, if one or more non-reservation occupants who have the obligation to wear the corresponding seat belts alights from the corresponding autonomous vehicle, the controller 27 subtracts the number of the one or more non-reservation occupants from the wearing-obligatory number of one or more reservation occupants obtained based on the reservation information to thereby calculate the wearing-obligatory number of one or more riding occupants, who have the obligation to wear the corresponding seat belts.

Additionally, if one or more non-reservation occupants who are exempted from the obligation to wear the corresponding seat belts ride on the corresponding autonomous vehicle, the controller 27 adds the number of the one or more non-reservation occupants to the wearing-nonobligatory number of one or more reservation occupants obtained based on the reservation information to thereby calculate the wearing-nonobligatory number of one or more riding occupants, who are exempted from the obligation to wear the corresponding seat belts.

Otherwise, if one or more non-reservation occupants who are exempted from the obligation to wear the corresponding seat belts alights from the corresponding autonomous vehicle, the controller 27 subtracts the number of the one or more non-reservation occupants from the wearing-nonobligatory number of one or more reservation occupants obtained based on the reservation information to thereby calculate the wearing-nonobligatory number of one or more riding occupants, who are exempted from the obligation to wear the corresponding seat belts.

Like the first embodiment, the controller 27 can be configured to execute the operation in step S22 again immediately after the following operation in step S25 described later, or can be configured to execute the operation in step S22 immediately before or after the following operation in step S27.

Following the operation in step S22, the controller 27 determines, based on the reservation information about the (N+1)-th travelling section, whether all the reservation occupants for the (N+1)-th travelling section have been riding on the corresponding autonomous vehicle in step S23. Upon determination that at least one of all the reservation occupants for the (N+1)-th travelling section have not been riding on the corresponding autonomous vehicle (NO in step S23), the controller 27 determines whether there is at least one reservation occupant, which has not been riding on the corresponding autonomous vehicle, for the (N+1)-th travelling section in the vicinity of the start station of the (N+1)-th travelling section in accordance with, for example, the positional information of at least one information terminal 4 corresponding to the at least one reservation occupant in step S24.

Upon determination that there is at least one reservation occupant for the (N+1)-th travelling section in the vicinity of the start station of the (N+1)-th travelling section (YES in step S24), the controller 27 returns to step S21, and repeatedly executes the operations in steps S21 to S24 until the determination in step S23 is affirmative or the determination in step S24 is negative.

Otherwise, upon determination that there are no reservation occupants for the (N+1)-th travelling section in the vicinity of the start station of the (N+1)-th travelling section (NO in step S24), the controller 27 determines whether a predetermined time has elapsed since the stop of the corresponding autonomous vehicle at the start station of the (N+1)-th travelling section in step S25. Upon determination that the predetermined time has not elapsed since the stop of the corresponding autonomous vehicle at the start station of the (N+1)-th travelling section (NO in step S25), the controller 27 repeatedly performs the determination in step S25.

Otherwise, upon determination that the predetermined time has elapsed since the stop of the corresponding autonomous vehicle at the start station of the (N+1)-th travelling section (YES in step S25), the controller 27 transmits, to the server 3, the occupant information about at least one reservation occupant, who has not been riding on the corresponding autonomous vehicle in step S26.

Upon determination that all the reservation occupants for the (N+1)-th travelling section have been riding on the corresponding autonomous vehicle (YES in step S23), or upon completion of the operation in step S26, the controller 27 identifies whether each seat belt is worn, i.e. fastened, in accordance with the wearing state of the corresponding seat belt detected by the corresponding seat belt detector 22 in step S27. In particular, the controller 27 calculates the seat-belt fastened seat number representing the number of one or more seats where the corresponding seat belts are fastened in accordance with the wearing state of each seat belt detected by the corresponding seat-belt detector 22 in step S27.

In step S28, the controller 27 determines whether the value of the wearing-obligatory number calculated in step S22 is equal to or less than the seat-belt fastened seat number calculated in step S27.

Upon determination that the value of the wearing-obligatory number calculated in step S22 is more than the seat-belt fastened seat number calculated in step S27 (NO in step S28), the controller 27 determines that at least one riding occupant, who has the obligation to wear the corresponding seat belt, is not wearing the corresponding seat belt. Note that the determination in step S28 is carried out based on the premise that all the riding occupants are seating on the corresponding seats so that there are no standing occupants in the corresponding autonomous vehicle.

Then, the controller 27 causes the notifying unit 26 to output a seat-belt wearing message that prompts the at least one riding occupant to fasten the corresponding seat belt in step S11. Thereafter, the controller 27 returns to step S27, and repeatedly executes the operations in steps S27, S28, and S11 until the determination in step S28 is affirmative.

Otherwise, upon determination that the value of the wearing-obligatory number calculated in step S22 is equal to or less than the seat-belt fastened seat number calculated in step S27 (YES in step S28), the controller 27 determines whether the predetermined vehicle start condition is satisfied in step S12.

Upon determination that the predetermined vehicle start condition is not satisfied (NO in step S12), the controller 27 repeatedly executes the determination in step S12.

Otherwise, upon determination that the predetermined vehicle start condition is satisfied (YES in step S12), the controller 27 causes the notifying unit 26 to inform all the riding occupants of a message indicative of a start of the corresponding autonomous vehicle in step S13. Thereafter, the controller 27 controls, for example, the steering mechanism 61 and the drive mechanism 62 to thereby cause the corresponding autonomous vehicle to start from the start station of the (N+1)-th travelling section in step S14, and thereafter, the controller 27 terminates the seat-belt wearing determination routine.

As described above, the vehicular control apparatus 5 installed in each autonomous vehicle according to the second embodiment is configured to (1) Calculate, based on the reservation information for the corresponding autonomous vehicle and the occupant information obtained by the occupant information obtaining unit 21, the wearing-obligatory number of one or more riding occupants, each of who has the obligation to wear the corresponding seat belt (2) Determine, based on the wearing-obligatory number and seat-belt fastened seat number indicative of the number of seat-belt fastened seats, whether each of one or more riding occupants, who has the obligation to wear the corresponding seat belt, is wearing, i.e. fastening, the corresponding seat belt (3) Cause the notifying unit 26 to notify information that prompts at least one occupant to wear the corresponding seat belt upon determination that the at least one occupant is not wearing the corresponding seat belt If the one or more riding occupants, who have the obligation to wear the corresponding seat belts, are not wearing the corresponding seat belts, this configuration reliably outputs, to the one or more occupants, information that prompts the one or more occupants to wear the corresponding seat belts while preventing output of the notification to one or more other riding occupants who are exempted from the obligation to wear the corresponding seat belts even if the other riding occupants are not wearing the corresponding seat belts.

In particular, the vehicular control apparatus 5 installed in each autonomous vehicle according to the second embodiment is configured to calculate, based on the occupant information obtained by the occupant information obtaining unit 21, the wearing-obligatory number of one or more riding occupants, each of who has the obligation to wear the corresponding seat belt. This configuration makes it possible to output information that prompts at least one riding occupant to wear the corresponding seat belt accurately upon determination that the at least one riding occupant, who has the obligation to wear the corresponding seat belt, is not wearing the corresponding seat belt even if the seat-belt obligatory/nonobligatory information is not included in the reservation information.

As described above, the controller 27 according to the second embodiment determines that at least one riding occupant, who has the obligation to wear the corresponding seat belt, is not wearing the corresponding seat belt based on the premise that all the riding occupants are seating on the corresponding seats so that there are no standing occupants in the corresponding autonomous vehicle.

If the one or more riding occupants can stand on the corresponding autonomous vehicle, the controller 27 can be configured to (1) Subtract, from the number of one or more riding occupants sitting on the corresponding seats detected by the seat detector 52, the wearing-nonobligatory number to thereby obtain a subtraction value (2) Determine that at least one riding occupant, who has the obligation to wear the corresponding seat belt, is not wearing the corresponding seat belt upon determination that the seat-belt fastened seat number is smaller than the subtraction value, thus causing the notifying unit 26 to output information that prompts the at least one occupant to wear the corresponding seat belt Providing the seat detector 52 in the vehicular control apparatus 2 according to the first embodiment enables the controller 27 to accurately determine whether at least one riding occupant, who has the obligation to wear the corresponding seat belt, is not wearing the corresponding seat belt even if the one or more riding occupants can stand on the corresponding autonomous vehicle.

The driverless operation system 10 according to the second embodiment can be configured as a non-reservation bus operation system in which users cannot make reservation of a selected autonomous vehicle.

The driverless operation system 10 according to this modification is configured to calculate the wearing-obligatory number in accordance with the riding occupant information about at least one occupant obtained by the occupant information obtaining unit 21, and the alighting occupant information about at least one occupant obtained by the alighting determiner 51.

Specifically, the driverless operation system 10 according to this modification can determine whether at least one occupant riding on the corresponding autonomous vehicle is at least one wearing-obligatory occupant or at least one wearing-nonobligatory occupant in accordance with the seat-belt obligatory/nonobligatory information about the at least one occupant obtained by the occupant information obtaining unit 21. Then, the driverless operation system 10 can count up the wearing-obligatory number by the number of the at least one occupant upon determination that the at least one occupant riding on the corresponding autonomous vehicle is the at least one wearing-obligatory occupant.

In addition, the driverless operation system 10 can determine whether at least one occupant alighting from the corresponding autonomous vehicle is at least one wearing-obligatory occupant or at least one wearing-nonobligatory occupant in accordance with the alighting occupant information about at least one occupant obtained by the alighting determiner 51. Then, the driverless operation system 10 can subtract, from the wearing-obligatory number, the number of the at least one occupant upon determination that the at least one occupant alighting from the corresponding autonomous vehicle is the at least one wearing-nonobligatory occupant.

This therefore makes it possible to use the driverless operation system 10 according to the second embodiment as a non-reservation bus operation system in which users cannot make reservation of a selected autonomous vehicle.

Each of the first and second embodiments determines whether to notify information that prompts at least one riding occupant to wear a corresponding seat belt in accordance with the wearing-obligatory number obtained based on the reservation information and the seat-belt fastened seat number.

As another example, each of the first and second embodiments can determine whether to notify information that prompts at least one riding occupant to wear a corresponding seat belt in accordance with the wearing-nonobligatory number obtained based on the reservation information and/or the riding occupant information, and the number of one or more seats, which will be referred to as a seat-belt non-fastened seat number, where the corresponding seat belts are not fastened.

Specifically, the controller 27 of each of the first and second embodiments can be configured to determine that all the one or more riding occupants, who have the obligation to wear their seat belts, are wearing their seat belts upon determination that the wearing-nonobligatory number is identical to the seat-belt non-fastened seat number. This disables the notifying unit 26 from outputting information that prompts at least one riding occupant to wear the corresponding seat belt.

In contrast, the controller 27 of each of the first and second embodiments can be configured to determine that at least one riding occupant, who has the obligation to wear the corresponding seat belt, is not wearing the corresponding seat belt upon determination that the wearing-nonobligatory number is more than the seat-belt non-fastened seat number. This causes the notifying unit 26 to output information that prompts the at least one riding occupant to wear the corresponding seat belt.

As the seat-belt non-fastened seat number, the number of one or more seats on which one or more riding occupants are detected to be seated by the seat detector 52 is preferably used. This prevents one or more empty seats in reserved seats for reservation occupants, on which no occupants are actually seated, from being counted as the seat-belt non-fastened seat number; these empty seats will be referred to as notification-unnecessary seats. This prevents output of prompting information even if there is at least one notification-unnecessary seat.

Each of the first and second embodiments can be configured to perform (1) A first determination of whether to notify information that prompts at least one riding occupant to wear a corresponding seat belt in accordance with the wearing-obligatory number and the seat-belt fastened seat number according to the first and second embodiments (2) A second determination of whether to notify information that prompts at least one riding occupant to wear a corresponding seat belt in accordance with the wearing-nonobligatory number and the seat-belt non-fastened seat number If a first result of the first determination is different from a second result of the second determination, each of the first and second embodiments can be configured to transmit, to the server 3, the occurrence of an error.

As described above, each of the first and second embodiments is configured to determine whether at least one riding occupant, who has the obligation to wear a corresponding seat belt, is wearing the corresponding seat belt in accordance with the reservation information about the at least one riding occupant stored in the server 3, the riding occupant information about the at least one riding occupant obtained from a selected information terminal 4 or the occupant information obtaining unit 21, and/or the alighting occupant information about the at least one riding occupant.

Each of the first and second embodiments can serve as a determiner for determining whether at least one riding occupant, who has the obligation to wear a corresponding seat belt, is wearing the corresponding seat belt without notifying information that prompts the at least one occupant to wear the corresponding seat belt in accordance of a result of the determination. Each of the first and second embodiments can be configured to determine whether the predetermined vehicle start condition is satisfied in accordance of a result of the determination of whether at least one riding occupant, who has the obligation to wear a corresponding seat belt, is wearing the corresponding seat belt.

The controller 27 of each of the first and second embodiments is configured to perform various determination tasks and/or calculation tasks in accordance with various pieces of sensor information obtained by the above components 21 to 24 and/or various sensors, but the present invention is not limited thereto. Specifically, at least one outside device located outside the corresponding autonomous vehicle can be configured to perform various determination tasks and/or calculation tasks in accordance with various pieces of sensor information obtained by the above components 21 to 24 and/or various sensors sent from the communication unit 25. Then, the controller 27 can be configured to receive the results of the determination tasks and/or calculation tasks received from the at least one outside device via the communication unit 25, and perform various control tasks of, for example, the components 61 to 63 in accordance with the received results of the determination tasks and/or calculation tasks.

Each of the vehicular control apparatuses 2 and 5 is installed in a vehicle, but is not limited thereto. Specifically, each of the vehicular control apparatuses 2 and 5 can be installed in a mobile object having one or more seats respectively having wearable seat belts, such as a ship or an airplane.

Each of the vehicular control apparatuses 2 and 5 according to the first and second embodiments is installed in a vehicle, but can be installed in an outside device installed in a server or a mobile terminal, such as a cellular phone, and the outside device can be configured to determine whether at least one riding occupant, who has the obligation to wear a corresponding seat belt, is wearing the corresponding seat belt.

The first and second embodiments of the present invention have been disclosed. It is evident that skilled persons in the art can modify the first and second embodiments without deviating from the scope of the present invention. All the modified or equivalent matters are meant to be included in the following claims.

REFERENCE SIGNS LIST

1 Driverless operation system
2 Vehicular control apparatus
5 Vehicular control apparatus
10 Driverless operation system
21 Occupant information obtaining unit
22 Seat-belt detector
26 Notifying unit
27 Controller
51 Alighting determiner

The invention claimed is:

1. An apparatus for controlling a vehicle that includes a plurality of seats each having a seat belt, a seat-belt detector configured to detect a wearing state of each of the seat belts, and a notifying unit that notifies various items of information, the apparatus comprising:
   a controller configured to determine whether to notify prompt information that prompts wearing of at least one of the seat belts in accordance with:
      a wearing-obligatory number representing the number of one or more occupants who ride on the vehicle and have an obligation to wear the corresponding one or more seat belts; and
      a seat-belt fastened seat number representing the number of one or more seats whose seat belts are fastened,
   wherein the controller is configured to:
      obtain information about each of the one or more occupants who ride on the vehicle from at least one information terminal used by each of the one or more occupants; and
      obtain the wearing-obligatory number in accordance with the information about each of the one or more occupants who ride on the vehicle.

2. An apparatus for controlling a vehicle that includes a plurality of seats each having a seat belt, a seat-belt detector configured to detect a wearing state of each of the seat belts, and a notifying unit that notifies various items of information, the apparatus comprising:
   a controller configured to determine whether to notify prompt information that prompts wearing of at least one of the seat belts in accordance with:
      a wearing-obligatory number representing the number of one or more occupants who ride on the vehicle and have an obligation to wear the corresponding one or more seat belts; and
      a seat-belt fastened seat number representing the number of one or more seats whose seat belts are fastened,
   wherein the controller is configured to:
      obtain information about each of the one or more occupants who ride on the vehicle from an input device provided in the vehicle; and
      obtain the wearing-obligatory number in accordance with the information about each of the one or more occupants who ride on the vehicle.

3. The apparatus according to claim 2, wherein:
the controller is configured to:
- determine whether the wearing-obligatory number is equal to or less than the seat-belt fastened seat number; and
- determine whether to notify the prompt information in accordance with a result of the determination of whether the wearing-obligatory number is equal to or less than the seat-belt fastened seat number.

4. The apparatus according to claim 3, wherein:
the controller is configured to determine not to notify the prompt information upon determination that the wearing-obligatory number is equal to or less than the seat-belt fastened seat number.

5. The apparatus according to claim 3, wherein:
the controller is configured to determine to notify the prompt information upon determination that the wearing-obligatory number is more than the seat-belt fastened seat number.

6. An apparatus for controlling a vehicle that includes a plurality of seats each having a seat belt, and a seat-belt detector configured to detect a wearing state of each of the seat belts, the apparatus comprising:
- a controller configured to determine whether each of one or more occupants, who ride on the vehicle and have an obligation to wear the corresponding one or more seat belts of the respective occupants, is wearing the corresponding seat belt in accordance with:
  - occupant information including seat-belt obligatory/nonobligatory information indicative of whether each of the one or more occupants has the obligation to wear the corresponding seat belt; and
  - the wearing state of each of the seat belts.

* * * * *